United States Patent [19]

Knox

[11] Patent Number: 4,480,429
[45] Date of Patent: Nov. 6, 1984

[54] FLY GUARD

[76] Inventor: Gayle B. Knox, 5661 Peridot Ave., Alta Loma, Calif. 91701

[21] Appl. No.: 476,590

[22] Filed: Mar. 18, 1983

[51] Int. Cl.³ .............................. B68C 5/00; A61F 9/02
[52] U.S. Cl. .............................................. 54/80; 2/440
[58] Field of Search ...................... 54/80, 81; 119/142, 119/143; 2/4, 15, 426, 440, 442, 454

[56] References Cited

U.S. PATENT DOCUMENTS

| | | | |
|---|---|---|---|
| 287,885 | 11/1883 | Sumner | 54/80 |
| 481,152 | 8/1892 | Steele | 54/80 |
| 903,108 | 11/1908 | Rogers | 54/80 |
| 2,150,791 | 3/1939 | Welsh | 2/440 |
| 2,248,864 | 7/1941 | Greiner | 2/440 |
| 3,104,508 | 9/1963 | O'Hare, Jr. | 54/81 |

Primary Examiner—Robert P. Swiatek
Attorney, Agent, or Firm—Lyon & Lyon

[57] ABSTRACT

A headdress for a horse having eye holes with upstanding members about the periphery of the eye holes. In a first embodiment, a cylindrical flange is employed with screening material extending across one end of the flange. In a second embodiment, a resilient toroidal insert is positioned within an annular pocket forming the periphery of the eye hole. A screen cap is positioned over the toroidal insert and is positioned with same in the annular pocket.

2 Claims, 5 Drawing Figures

FLY GUARD

BACKGROUND OF THE INVENTION

The field of the present invention is gear for horses, particularly for protection from insects.

It has long been known that horses and other animals can be severely bothered by flies and other insects. One of the areas of greatest irritation is the ophthalmic region. To combat this irritation, it has been known to place netting over the head or a portion of the head of the horse or other animal to protect the eyes. Such devices have generally included a gathering of material such that it is displaced away from the surface of the head of the animal over the eye portions and may be drawn close to the head in a peripheral area. Such devices often can be easily shifted out of position by the animal or distorted such that the screen device contacts the eye and induces rather than prevents irritation.

SUMMARY OF THE INVENTION

The present invention is directed to protection gear for horses to keep flies and other insects from the ophthalmic region. The gear is securely positionable on the animal and insures against contact with the animal's eyes.

In one form of the invention, a conventional headdress is provided with eye holes. An upstanding member encircling each eye is included on the headdress along with screen material across the eye hole on the upstanding member. The upstanding member may be provided by a circular flange extending outwardly from the periphery of the eye hole or by a resilient toroidal ring with screen material extending thereacross and secured within an annular pocket in the headdress around each eye hole. Soft material may be provided on the inside of the headdress around each eye for added protection against irritation.

Accordingly, it is an object of the present invention to provide improved protection from insects for horses. Other and further objects and advantages will appear hereinafter.

DETAILED DESCRIPTION OF THE PREFERRED EMBODIMENTS

Figure 1:
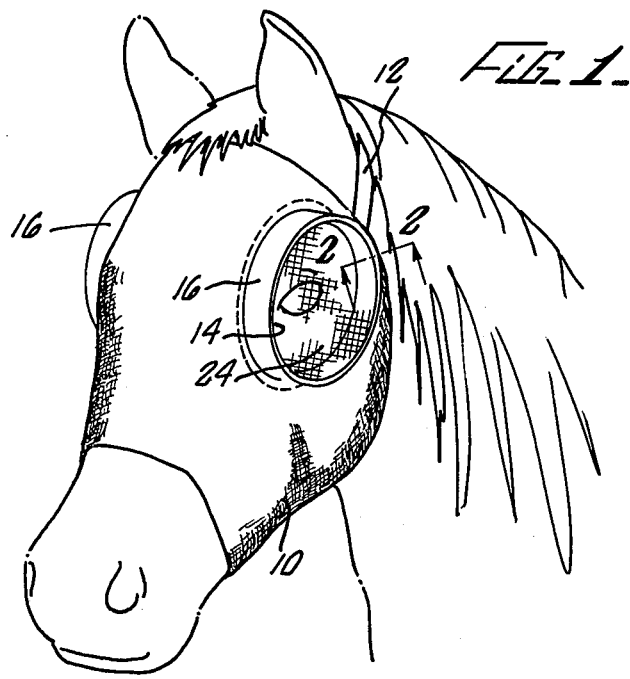
FIG. 1 is a perspective view of a device of the present invention positioned on a horse.
Figure 2:
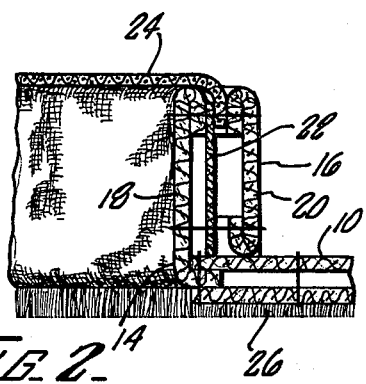
FIG. 2 is a detailed cross-sectional view taken along line 2—2 of FIG. 1.

Turning in detail to the drawings and particularly the embodiment of FIGS. 1 and 2, a headdress 10 of generally conventional construction is illustrated which includes any necessary straps 12 and the like, also conventionally known. The headdress 10 is designed such that it cannot be easily moved from position by the animal. Naturally, a variety of styles of such headdresses 10 and a means for securing same are available and are contemplated for use with the present invention.

The headdress naturally includes eye holes 14 which are substantially larger than the ophthalmic regions of the horse in order that no irritation of the eye from the headdress can occur. Once again, such considerations are well known.

Positioned about each eye hole 14 is an upstanding member 16. In the embodiment of FIGS. 1 and 2, this upstanding member 16 is located about the periphery of each eye hole and thereby forms a cylindrical flange. This cylindrical flange may or may not be circular as may be conveniently designed. The cylindrical flange 16 extends outwardly from the headdress and thus forms a roughly perpendicular intersection therewith. The construction of the cylindrical member 16 may take on any form of sufficient rigidity to allow it to retain its shape. In the preferred embodiment of FIGS. 1 and 2, material has been sown together in a laminated arrangement. Three layers of material generally make up the upstanding member 16 including an innerfacing 18, an outer facing 20 and a stiffened insert 22. The stiffened insert need not be fully rigid but may be made of such material as crinoline. The materials are stitched together leaving additional material for attachment to the headdress 10 and tacking such that the upstanding member 16 will remain in position.

Extending across the eye hole and positioned on the upstanding member 16 is screen-like material 24. This material must be relatively transparent through which the horse is able to see. At the same time, the interstices in the screen should be small enough so that troublesome insects cannot work their way through the screen to the ophthalmic region.

On the underside of the headdress 10 in an annular arrangement about each eye hole 14 is soft material 26 which may be employed to give added protection to the eye. This material 26 may be any of a variety of padded or long fiber materials. The width of the material 26 may also vary to accommodate any roughened or raised portion of the construction.

Figure 3:
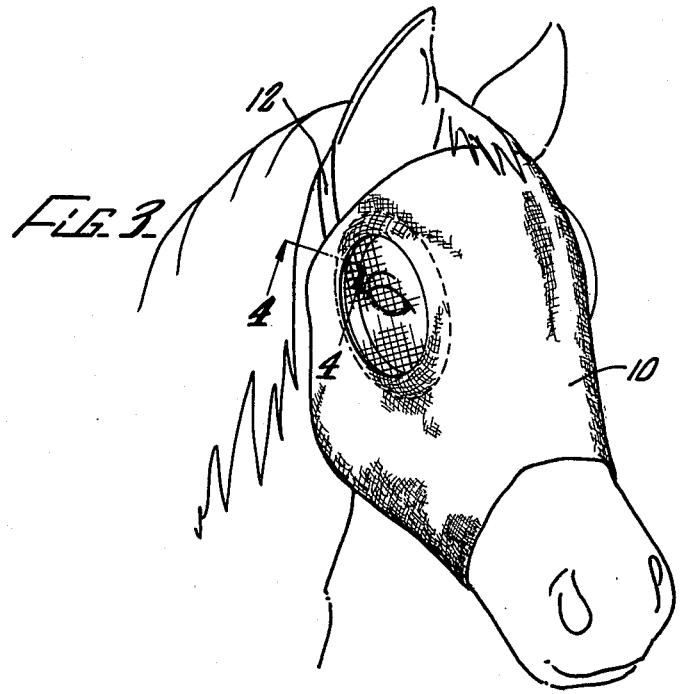
FIG. 3 is a perspective view of a second embodiment of the present invention illustrated on a horse.
Figure 4:
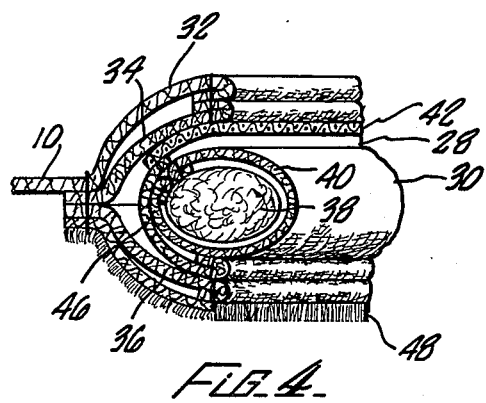
FIG. 4 is a detailed cross-sectional view taken along line 4—4 of FIG. 3.
Figure 5:
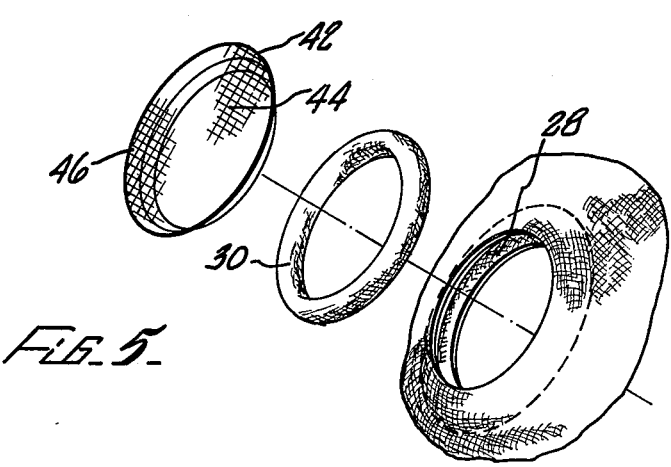
FIG. 5 is an exploded assembly view of the embodiment of FIG. 3 illustrated in perspective view.

Turning then to the embodiment of FIGS. 3, 4 and 5, an annular pocket 28 is formed in the periphery of the eye hole of the headdress 10. The pocket faces inwardly to define the eye hole and to provide a location for a resilient toroidal insert 30. The pocket 28 is formed by an extension of the headdress 10 at 32. A lining 34 then forms the inside of the upper portion of the pocket 28. To form the lower lining of the pocket, a liner 36 is stitched to the headdress 10 and the upper liner 34.

The resilient toroidal insert 30 includes a length of resilient material 38 such as foam rubber set within a material sheath 40. The resilient toroidal insert 30 thus forming a ring is sized in cooperation with the pocket 28 such that the insert 30 will be placed in some compression when positioned in the pocket 28. Thus, the device is retained therein and yet allows for easy removal.

Positioned about the toroidal insert 30 is a screen cap 42. The screen cap 42 includes a screen section 44 forming a substantially planar screen barrier across the eye hole. Located about the periphery of the screen section is a ring section 46 which includes an inwardly extending portion defining an inwardly facing channel for receipt of the toroidal insert 30. The resilient toroidal insert 30 may then be positioned in the screen cap 42. This stretches the screen section 44 to remove substantially all of the bends and wrinkles. This assembly may then be placed in the pocket 28 as shown in FIG. 3.

As discussed above with regard to the first embodiment, an annular ring of soft material 48 may be positioned about the underside of the headdress around the eye hole to provide further protection from irritation for the animal.

Accordingly, an improved headdress for protecting horses from flies and other insects has been disclosed in two embodiments. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed:

1. A fly guard for a horse, comprising
   a headdress having eye holes and including annular pockets about each said eye hole;
   resilient toroidal inserts sized to fit in compression in said annular pockets;
   screen caps extending over each said resilient toroidal insert and having a substantially planar screen section and a ring section extending about the periphery of said screen section, said ring section including an inwardly facing channel for receipt of said resilient toroidal insert.

2. The fly guard of claim 1 further including an annular layer of soft material extending about each said eye hole inside of said headdress.